March 15, 1966 J. L. HOLMAN 3,240,427

KEYBOARD METHOD, APPARATUS AND SYSTEM FOR DATA TRANSMISSION

Filed June 11, 1962 2 Sheets-Sheet 1

JIMMIE L. HOLMAN

By: Frank C. Maley
Agent

JIMMIE L. HOLMAN

By: Frank C. Maley
Agent

United States Patent Office 3,240,427

Patented Mar. 15, 1966

3,240,427

KEYBOARD METHOD, APPARATUS AND SYSTEM FOR DATA TRANSMISSION

Jimmie L. Holman, 4702 Marion Circle, Corpus Christi, Tex.

Filed June 11, 1962, Ser. No. 201,513
3 Claims. (Cl. 235—145)

This invention has to do with the transmission, especially over telephone lines or similar channels, of data derived from the operation of keyboard calculators, adding machines and similar office equipment.

The development of large, flexible and high-speed data-processing systems has made it possible for large businesses to handle a variety of internal control problems, such as inventory, cost-accounting, payroll calculation, sales and tax data and the like, in a very efficient manner. Smaller businesses, particularly those not large enough to justify the expense of an adequate processing system, may make use of central "service bureaus" or the like which share data-processing equipment among a number of customers or subscribers.

To avoid the delay and complication involved in conveying numerous bulky records to and from such centers or bureaus, with attendant risk of loss thereof, it would be highly desirable to provide ways and means by which the basic coded information could be transmitted instantaneously from the user's premises, for example over ordinary telephone channels.

Telephone companies provide a leased data-transmission system of the code tone ("Data Phone") type for use over their lines. However, specially designed data-input equipment is required to make use of such systems, at costs which are again prohibitive for a large part of the businesses which could benefit from their use.

It is accordingly a principal object of this invention to provide extremely simple and low-cost apparatus by which an ordinary desk calculator, such as available in nearly every business or office, can be employed to control available phone-line data transmission systems as above described. Since not even the keyboard assembly need be the subject of an additional investment, the cost to the user is made extremely small. In addition, where the desk calculator has the usual provision for printing a tape record of the steps in its operations, the user has the additional advantage of a permanent and accurate file copy of the basic data so transmitted, with no additional cost or complication.

A further object of the invention is to provide a method by which such an office-type keyboard machine may be very simply modified to serve the additional functions stated above, without in any way interfering with its daily employment for its usual purposes.

In general, the invention accomplishes the above (and other) objects by the provision of a contact-making or switch unit in direct mechanical association with each of the keys of any conventional desk calculator, most preferably of the ten-key adding type, and connecting these units to control a simple relay matrix whose output contact-combinations directly control the tone selections of the known Data Phone or equivalent telephone-line telemetering transmitter. Provisions are included for properly segregating the matrix-input signals into groups corresponding to the "function" (non-numerical) keys, so that by a suitable program pre-arranged with the computing center or bureau, large masses of data can be handled accurately and expeditiously. If desired, provisions for an answer-back or verification transmission may readily be utilized.

At the processing central, the tone-combination signals are decoded or interpreted by conventional equipment and cards punched or tapes recorded or punched for further processing, computation et cetera. If desired, a solenoid-operated slave calculator or printer may be directly controlled to duplicate the subscriber's printed tape record.

The principles of the invention will best be comprehended from the following detailed specification of a preferred embodiment thereof, given by way of illustration and without thereby intending to limit the scope of the invention. The specification is to be read in connection with the appended drawings, in which.

Figure 1:
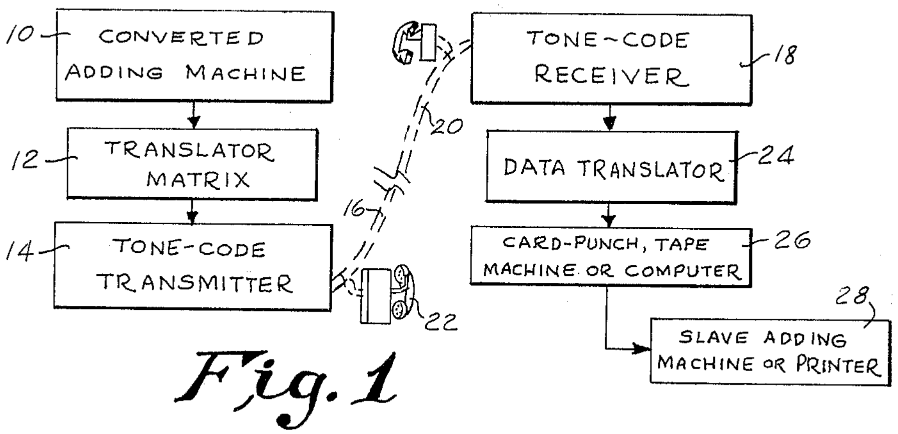
FIG. 1 is a simplified block diagram of such a typical system.

Referring to FIG. 1 of the drawings, an outline of the complete system is shown in block form. To the left is shown the equipment at the subscriber's or user's station or office, including the converted or modified desk calculator indicated at 10, connected by cabling to the translator matrix 12 forming a part of the invention. The latter unit supplies controlled contact-closure combinations to the conventional tone-code data transmitter 14. The transmitter 14 in turn is connected over the usual leased or dial up telephone line 16, and ordinary central office switching equipment (not shown) to the equipment at the data-processing center, shown at the right of FIG. 1.

The apparatus at the data processing center includes a conventional leased tone-code receiver 18 connected over line 20 to the telephone central office, and thereby to the subscriber's station line 16. Voice communication, programmed or by a break-in signal or call, is available over the same phone line, as suggested by the telephone handset 22.

The signals (contact combinations) from receiver 18 are employed to control a conventional decoder or translator 24 at the processing center, the same putting the data into proper form for direct control of the punched card or magnetic tape recorder, tape punch or computer equipment 26 for processing. A slave printer 28 may optionally be controlled from the latter, if desired, these auxiliary processing devices at the center being chosen in accordance with the nature of the service being performed for the subscriber.

Figure 2:
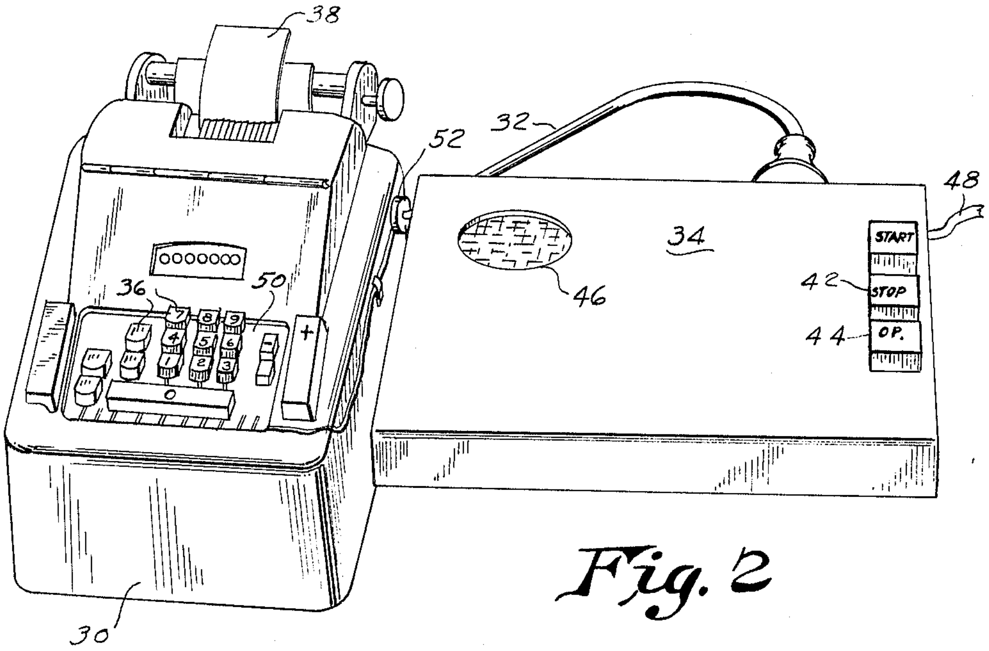
FIG. 2 is a perspective view of a known and typical desk adding machine, slightly modified in accordance with the invention, and shown as connected to the code-translating matrix which is in turn connected to the Data-Phone transmitter.

FIG. 2 shows the principal novel features of the subscriber equipment, numeral 30 representing a wholly conventional ten-key adding machine whose keyboard has been modified (in a manner to be described below) so that each key operation closes an appropriate circuit connected over a cable 32 to a coding matrix in housing 34. The key buttons 36 also, of course, still control the printing, listing, and/or adding-subtracting devices of the desk calculator, the printed tape being indicated at 38.

Housing unit 34 also provides several control switches 40, 42, 44 for transmitting special signals required, such as "start," "stop" and "operator (call)" signals for proper coordination of the two ends of the data link. For convenience, the usual receiver of the subscriber's telephone handset is replaced by, or augmented by, a loudspeaker 46 which may conveniently be fed from the telephone line or by a transistorized amplifier in the housing.

An output cable 48 connects the matrix and other components in housing 34 to the tone transmitter of the leased Data-Phone system, and thence the signals pass to the subscriber's telephone line 16 as described in connection with FIG. 1.

The electrical connections to the keyboard of calculator 30 are preferably made through displaceable electric contacts carried by a printed circuit board 50 slotted so that it can be slipped over the key shanks after their buttons 36 have been removed. The board is then preferably secured to the existing key plate by small screws, and the buttons replaced, to avoid the need for in any way interfering with the use of the machine for its other functions. If desired, a plug and jack connection 52 to cable 32 may be provided, so that machine 30 can be readily disconnected for use elsewhere.

Figures 3, 4:
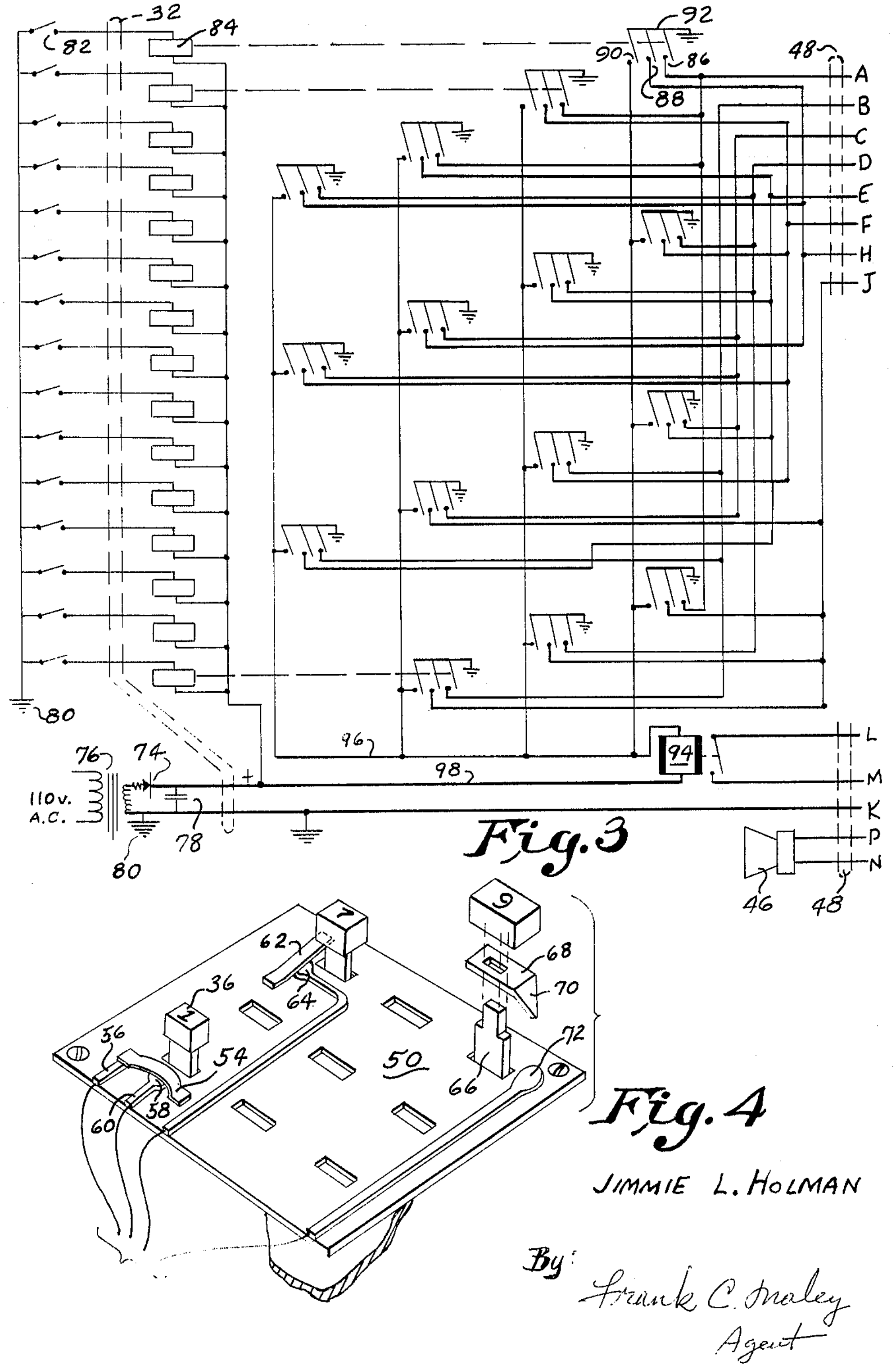
FIG. 3 is a schematic wiring diagram of a preferred relay-type translating matrix forming a part of the invention, showing its connections to the adding machine.
FIG. 4 is an enlarged perspective view of portion of a calculator keyboard, illustrating several optional methods of providing the key-operated electrical contacts.

Turning now to FIGS. 3 and 4 of the drawings, the way in which operation of individual keys of the desk calculator 30 is made to effect the desired combinations of closed circuits (contact closures), required for the Data-Phone control, will be described.

Each keyboard key (button or shank) of the calculator 30 is arranged to operate (close) a respective contact set carried by board 50; or, alternatively, a contact electrically connected to each key is merely made to engage a fixed terminal on that board. In the latter case, the current path will include the conductive (metal) parts of the calculator. These variations are illustrated in FIG. 4, in which the "1" key has its button 36 arranged to depress a bowed leaf spring 54 secured at one end to the board conductor 56 and thus urged against a terminal or contact 58 also secured to (or forming a part of) another board conductor 60. The "7" key is shown as cooperating with a simple cantilever contact spring 62 to urge it against a conductor terminal 64.

In the case of the "9" key button, the circuit includes the metallic key bar shank 66, shouldered to receive the button. A conductive contact 68 is pierced to fit over the upper shank and held on by the button when the latter is replaced. A projection 70 on contact 68 then engages board terminal 72 when the button is operated.

Returning to FIG. 3, a rectifier 74 powered from the A.C. line by a small transformer 76 provides approximately 24 volts D.C. to the key switches and the relays of the translator matrix 12. A condenser 78 smooths out any excessive ripple, acting as a filter in conjunction with the (inductive) relay windings. One side of this D.C. supply is connected to the machine frame as at 80, and each machine key contact 82 can thus complete a circuit through a matrix relay winding 84, via conductors in cable 32.

Energization of winding 84 causes closure of contacts 86, 88 and 90 of that relay to the common contact 92 grounded as shown. Contacts 86 and 88 operate to connect together (and to ground) terminals A and H (for example) of the Data-Phone control cable 48 to prepare for transmission of one tone-code combination to the remote processing center as already described. However, actual transmission of the tone requires closure of the "keying" conductor terminals L and M. This is accomplished only after operation (closure) of contact 90 of relay 84, which energizes keying relay 94 over common leads 96 and 98. Since relay 94 has a finite (though short) pull-in time, the arrangement ensures that the Data-Phone transmitter will not be keyed prior to complete closure of selecting contacts 86 and 88.

The other calculator key contacts control respective other relays such as 84 in precisely the same manner, and the respective selecting contacts of these make the controlling contact closures to respective pairs of the other Data-Phone terminals B–J. Obviously, by a simple extension of this system, data transmitters with more elaborate tone combinations, such as for alpha-numeric information, can be controlled; e.g., from a typewriter keyboard, cash register or the like.

A detailed description of the kinds of systems that are designated by the term "Data-Phone" is available in the literature; for example, at pages 74–80 of an article by R. Sokoler in the March 1962 issue of the Bell Laboratories Record.

While the invention has been described in preferred forms for a specific application, no unnecessary limitations to such details are intended, except as may be required by the scope of the appended claims.

What is claimed is:

1. In combination, a calculator having a keyboard plate and a plurality of key bars extending therethrough, a printed circuit plate apertured to pass said keybars, individual circuit-closing contacts carried by said circuit plate adjacent to at least some of said respective key bars, and means on each corresponding key bar for directly operating a respective one of said contacts upon the depression of said key bar.

2. The combination of claim 1, in which the said means on each key bar comprises a finger-operable button.

3. The combination of claim 1, in which the said means on each key bar includes a laterally projecting tongue secured between an operating button and a shoulder on said key bar.

References Cited by the Examiner

UNITED STATES PATENTS

| | | | |
|---|---|---|---|
| 1,078,626 | 11/1913 | Kelley | 235—145 |
| 1,190,176 | 7/1916 | Kingsbury | 340—337 |
| 1,701,436 | 2/1929 | Baker | 235—146 X |
| 1,773,392 | 8/1930 | Eichenauer | 235—145 |
| 1,972,985 | 9/1934 | Gardner | 235—145 |
| 2,528,394 | 10/1950 | Sharpless et al. | 235—61 |
| 2,566,278 | 8/1951 | Williams | 200—5 |
| 2,810,785 | 10/1957 | Lee | 235—61 |
| 2,932,816 | 4/1960 | Stiefel et al. | 2.13 X |
| 2,964,740 | 12/1960 | Hense | 235—145 X |

FOREIGN PATENTS

| | | |
|---|---|---|
| 375,852 | 3/1907 | France. |

LEO SMILOW, *Primary Examiner.*